K. W. DAUGHDRILL.
WHEEL LOCKING ATTACHMENT FOR TRAM CARS.
APPLICATION FILED AUG. 28, 1908.
917,553.
Patented Apr. 6, 1909.
2 SHEETS—SHEET 1.
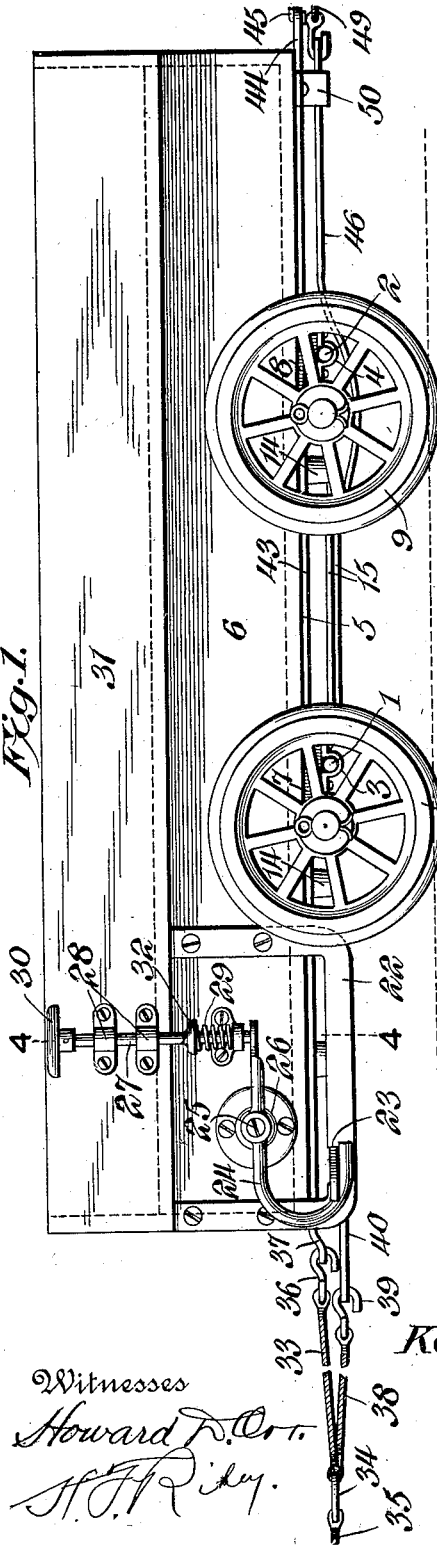
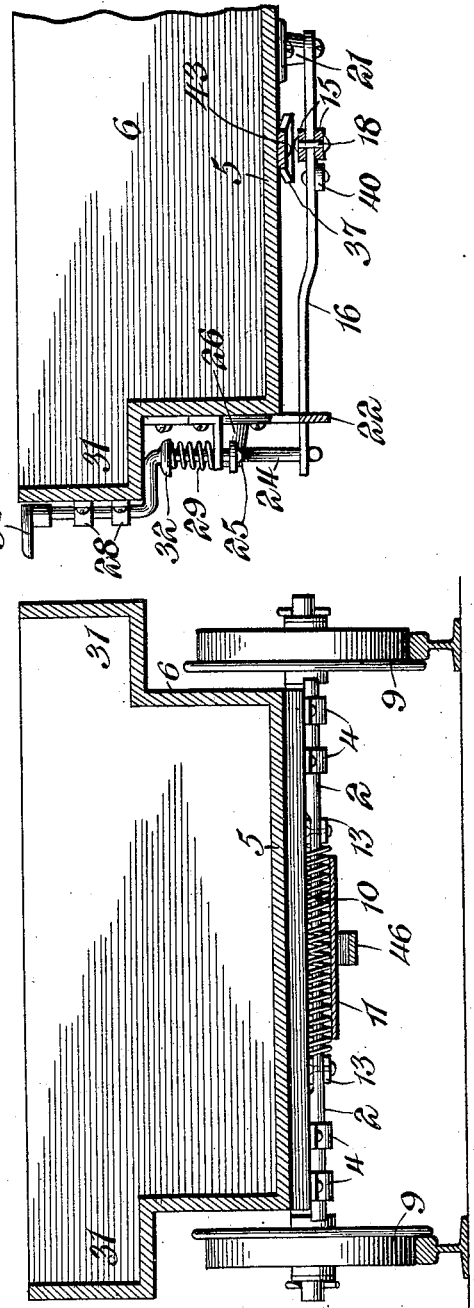
Kenneth W. Daughdrill, Inventor,
Witnesses
Howard D. Orr.
H. F. Riley.
By E. G. Siggers,
Attorney K. W. DAUGHDRILL.
WHEEL LOCKING ATTACHMENT FOR TRAM CARS.
APPLICATION FILED AUG. 28, 1908.
917,553.
Patented Apr. 6, 1909.
2 SHEETS—SHEET 2.
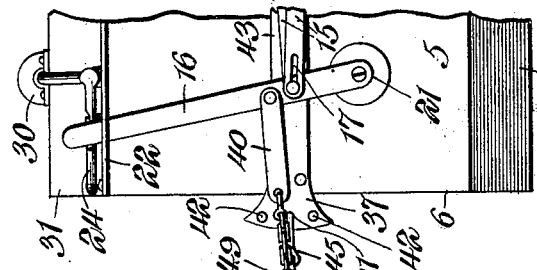
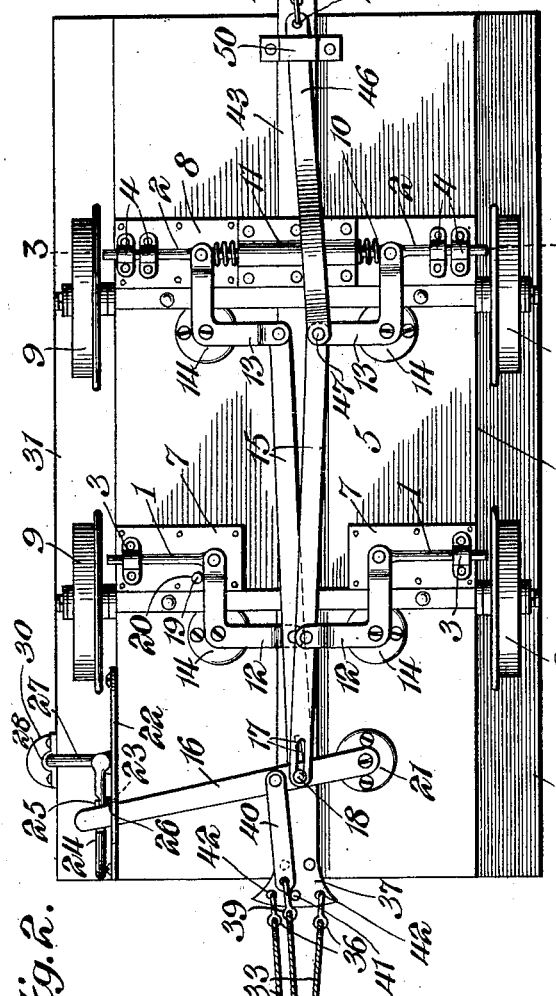
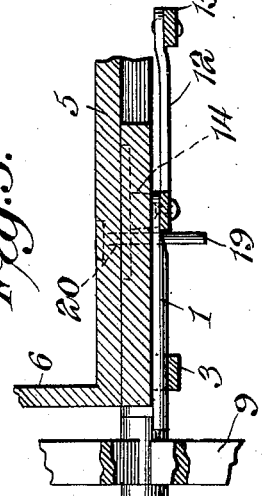
Kenneth W. Daughdrill, Inventor,
Witnesses
By E. G. Siggers
Attorney

UNITED STATES PATENT OFFICE.

KENNETH WRIGHT DAUGHDRILL, OF ONEONTA, ALABAMA.

WHEEL-LOCKING ATTACHMENT FOR TRAM-CARS.

No. 917,553.  Specification of Letters Patent.  Patented April 6, 1909.

Application filed August 28, 1908. Serial No. 450,745.

*To all whom it may concern:*

Be it known that I, KENNETH WRIGHT DAUGHDRILL, a citizen of the United States, residing at Oneonta, in the county of Blount and State of Alabama, have invented a new and useful Wheel-Locking Attachment for Tram-Cars, of which the following is a specification.

The invention relates to improvements in wheel locking attachments for tram cars.

The object of the present invention is to improve the construction of wheel locking attachments for tram cars, more especially that shown and described in Patent numbered 869,257, granted Oct. 29, 1907, to Thomas Parker, and to enable the wheels of a car to be automatically locked when the car stops, and capable of automatically relieving the wheels of the locking devices when it is desired to start the car.

A further object of the invention is to provide a wheel locking attachment of this character in which the wheel locking devices will be connected with and automatically controlled by the draft mechanism to lock the wheels when the draft mechanism is slackened, and to relieve the wheels of the locking devices when the draft mechanism is subjected to strain, whereby the wheel locking devices of the entire train of cars are automatically operated by the starting and stopping of an engine or other actuating means.

Another object of the invention is to provide a wheel locking attachment for tram cars, adapted to engage both the front and rear wheels and equipped with means for relieving the wheels at one side of the locking devices when desired.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a tram car, provided with a wheel locking attachment constructed in accordance with this invention. Fig. 2 is a reverse plan view, showing the wheel locking attachment applied to one car and a portion of another car. Fig. 3 is a transverse sectional view, taken substantially on the line 3—3 of Fig. 2. Fig. 4 is a transverse sectional view of one side of the car, taken substantially on the line 4—4 of Fig. 1. Fig. 5 is an enlarged detail sectional view, illustrating the manner of locking the wheel engaging device at one side of a car out of operation. Fig. 6 is a sectional view, illustrating the manner of coupling two cars. Fig. 7 is a detail sectional view, illustrating the manner of connecting the front ends of the connecting rods with the transverse side levers.

Like numerals of reference designate corresponding parts in all the figures of the drawings.

1 and 2 designate front and rear transversely disposed locking pins or rods, slidably mounted in suitable guides 3 and 4, which are arranged at the lower face of the bottom 5 of the body 6 of a tram or mining car and which may be of any preferred construction. The front guides 3 are secured to blocks or pieces 7, fastened to the bottom 5 of the body and located at opposite sides of the same, as clearly shown in Fig. 4 of the drawings. The rear guides 4 are secured to the lower face of the transverse bar 8, extending across the rear portion of the bottom 5 of the body and bolted, or otherwise fastened to the same. The locking rods, when free to move outwardly, are automatically thrown into engagement with the front and rear wheels 9 of the car by means of a coiled spring 10, arranged within and supported by a casing or housing 11 and engaging the inner portions of the rear rods 2, the latter being preferably extended into the end portions of the coiled spring, as shown. The locking rods are pivotally connected to front and rear bell crank levers 12 and 13, fulcrumed at their angles to suitable supports 14 by means of screws, or other suitable fastening devices and having their arms extending longitudinally and transversely of the car. The longitudinal arms are connected with the transversely movable locking rods, and the transversely disposed arms are pivoted to a pair of longitudinal rods or bars 15, connected at their front ends to a transversely disposed setting lever 16. The rear ends of the rods or bars 15 are connected to the rear bell crank levers 13, and the front bell crank levers 12 are pivoted to the rods or bars 15 at points intermediate of the ends thereof. The front ends of the rods or bars 15 are provided with longitudinal slots 17, which receive a pivot 18 for connecting the rods or bars 15 with the said setting lever 16. These slots permit the locking rods at one side of the car to move independently of the locking rods of the other side of the car, and they enable the locking rods or wheel-engaging devices at one side of the car to be held out of engagement with the wheel, as illustrated in Fig. 2 of the drawings. This operation is effected by means of a drop pin 19, extending through a perforation of the bottom of the car at the right hand block 7 in Fig. 2, a suitable perforation 20 being provided for this purpose. The lower end of the drop pin extends below the plane of the adjacent right hand bell crank lever and engages the longitudinal arm thereof at the outer edge of the same. Although the drop pin 19 is shown at the right hand side of Fig. 2 of the drawings, it will be readily apparent that it may be arranged at either side of the car.

The setting lever 16 is pivoted at its inner end to a support 21, and its outer portion extends to a substantially U-shaped keeper 22, consisting of a horizontal bottom portion and upwardly extending sides, which are secured to the body of the car at one side thereof, as clearly shown in Fig. 1 of the drawings. The bottom portion of the keeper is provided near its outer end with a notch 23, located at the upper edge of the said bottom portion and arranged to receive the setting lever, whereby the locking rods are held in a retracted position against the action of the spring, which is compressed when the locking rods are withdrawn from engagement by the wheels of the car. The outer end of the setting lever projects beyond the keeper and is disengaged from the shoulder at the inner end of the notch 23 by means of a tripping lever 24.

The tripping lever 24 is fulcrumed between its ends on the body of the car at a point between the upwardly extending sides of the keeper by means of a suitable pivot 25 mounted on a support 26. One arm of the tripping lever is straight and extends inwardly beneath an operating rod 27, and the other arm is curved downwardly and inwardly being approximately U-shaped to extend beneath the outer end of the setting lever 16. The operating rod, which is mounted in suitable guides 28, is supported in an elevated position by a coiled spring 29, and it is provided at its upper end with a head or button 30, which is adapted to be struck with the hand, or otherwise depressed for operating the tripping lever to lift the setting lever out of engagement with the shoulder of the keeper. The guides 28, which may be of any suitable construction are secured to the adjacent side of the body of the car, which has an outwardly extending projecting portion 31, and the operating rod is angularly bent to conform to the configuration of the body of the car, as clearly illustrated in Fig. 4 of the drawings. The operating rod is composed of vertical upper and lower portions and an intermediate connecting portion. The lower vertical portion receives the coiled spring, which engages a flange or collar 32 for supporting the rod in an elevated position. The lower end of the spring bears against the guide, which receives the lower portion of the operating rod. A sudden blow on the head or button 30 will throw the setting lever out of engagement with the keeper, and the spring 10 will automatically move the locking rods into engagement with the wheels. The locking rods may be readily withdrawn from engagement with the wheels by springing the setting lever outwardly or forwardly.

The brake mechanism or wheel locking mechanism is automatically controlled by the draft mechanism, which is equipped with side draft cables 33, or other flexible connections, forming flexible draft members and secured at their outer ends to a circular coupling member or ring 34, which is connected at its front or outer portion with a central cable 35. The side or draft cables are provided at their rear ends with hooks 36 for detachably engaging a draw head 37, whereby the side cables are connected with the tram or mining car. The draft mechanism is also equipped with a central cable 38, forming an intermediate flexible connecting member and secured at its front or outer end of the coupling member 34. The rear end of the central cable 38 is provided with a hook 39, which is linked into a perforation of a front pivoted bar 40, connected at its rear end with the setting lever and through the setting lever and the connecting bars or rods 15 with the bell crank levers and the locking rods. The central cable is of a length to be drawn taut before the side cables, whereby when the draft mechanism is placed under tension, the wheel-engaging devices will be disengaged from the wheels before the side cables are stretched and the car started. As soon as the engine, or other means for pulling a train of cars stops, the slackening of the central and side cables will permit the coiled spring 10 to throw the locking members automatically into engagement with the wheels, whereby the cars will be locked on a grade. The coupling member 34 is provided with perforations for the reception of the front ends of the central and side cables 33 and 38 and the front cable 35, but the cables, or other flexible connections may be secured to the coupling member 34 in any other preferred manner.

The draw head 37, which is provided with central and side perforations 41 and 42, is formed integral with a draft bar 43, extending the entire length of the body of the car and projecting in advance and in rear of the same, the rear end 44 being provided with a perforation for the reception of a coupling device 45 for coupling two cars together. The coupling device may be of any preferred construction, and is flexible to admit of automatic operation of the wheel-engaging device throughout an entire train. The coupling device 45 may consist of a ring and a pair of hooks, and it engages the central perforation of the front end of the rear car, as clearly shown in Fig. 2 of the drawings.

The wheel locking or brake mechanism is also equipped with a rear bar or member 46, pivoted at its front end 47 to the transverse arm of one of the rear bell crank levers, and provided at its rear end with a perforation 48 for enabling it to be connected by a chain 49, or other suitable means with the front bar 40 of the next car. The chain is provided with front and rear hooks to engage the perforation 48 of the rear bar and a perforation of the front end of the bar 40. The chain 49 constitutes a flexible brake coupling and when slackened permits the spring actuated locking rods of the rear car to engage the wheels. The rear portion of the rear bar 46 is arranged within a loop or keeper 50 for maintaining the bar or member 46 in proper position centrally of the car.

The front coupling device, formed by the coupling member 34 and its cables is detachable and may be applied to any car, and may be readily transferred from one car or train to another.

Having thus fully described my invention, what I claim as new and desire to secure by Letters Patent, is:—

1. In an attachment of the class described, the combination with brake mechanism including devices for automatically engaging the wheels of a car, flexible draft mechanism, and a flexible connection extending from the flexible draft mechanism to the brake mechanism and automatically operated by the former to relieve the wheels of the said engaging devices.

2. In an attachment of the class described, the combination with a car, of brake mechanism including devices for automatically engaging the wheels of a car, draft mechanism provided with a flexible member connected with the car, and a flexible member extending from the draft mechanism to the brake mechanism and being of a length to cause the wheel-engaging devices to be withdrawn from engagement with the wheels by the draft mechanism before the flexible member thereof is drawn taut.

3. In an attachment of the class described, the combination with a car, of brake mechanism including automatically operable wheel-engaging devices, draft mechanism having flexible side members connected with the car, and a flexible central member extending from the draft mechanism to the brake mechanism and being of a length to cause the wheel-engaging devices to be withdrawn from engagement with the wheels before the flexible members of the draft mechanism are drawn taut.

4. In an attachment of the class described, the combination with a car, of brake mechanism including automatically operable wheel-engaging devices, and means for automatically moving the same into engagement with the wheels, draft mechanism composed of a coupling member, and flexible side members secured to the coupling member and to the car, and a central flexible connection secured to the coupling member and connected with the brake mechanism and automatically operated by the draft mechanism to relieve the wheels of the said engaging devices.

5. In an attachment of the class described, the combination of a car provided with a draw head having a draw bar extending the entire length of the car and projecting in advance and in rear thereof, the front end being provided with a draw head having central and side perforations and the rear end of the draw bar being provided with a single perforation, brake mechanism including wheel-engaging devices, and means for automatically moving the same into engagement with the wheels, a coupling member, flexible side members secured to the coupling member and provided with means for detachably engaging the side perforations of the draw head, a central flexible member secured to the coupling member, and means for connecting the central member with the wheel-engaging devices, whereby the latter will be withdrawn from engagement with the wheels by the coupling member before the flexible side members are drawn taut.

6. In an attachment of the class described, the combination with a car, of brake mechanism including wheel-engaging locking rods, a spring for actuating the same, and operating means for withdrawing the locking rods including a pivoted bar or member, draft mechanism provided with flexible side members connected with the car, and a central flexible member extending from the draft mechanism to the pivoted bar of the brake mechanism.

7. In an attachment of the class described, the combination with a car having a draw head, of brake mechanism provided with a pivoted bar, a coupling ring, side draft members secured to the ring and connected with the draw head, and an intermediate flexible member extending from the ring to the pivoted bar of the brake mechanism.

8. In an attachment of the class described, the combination with a car, of brake mechanism including spring actuated wheel-engaging locking rods, and means for withdrawing the same having front and rear pivoted bars, draft mechanism connected with the car and provided with a flexible member extending to and connected with the front pivoted bar, and means for connecting the rear pivoted bar with the front pivoted bar of another car.

9. In an attachment of the class described, the combination with a car, of brake mechanism including spring actuated locking wheel-engaging rods, bell crank levers connected with the rods, bars connecting the bell crank levers, and front and rear bars connected with the said bars, a front draft connection composed of a coupling member, side draft members extending from the coupling member to the car, and an intermediate flexible member extending from the coupling member to the front bar, and means for connecting the rear bar of the brake mechanism with the front bar of another car.

10. In an attachment of the class described, the combination with a car, of front and rear spring actuated wheel-engaging rods, levers connected with the locking rods, a pair of connecting bars connecting the said members and movable independently of each other, operating mechanism connected with the said bars, and a pin mounted on the car for engaging one of the levers to hold the locking devices at one side of the car out of engagement with the wheels.

In testimony, that I claim the foregoing as my own, I have hereto affixed my signature in the presence of two witnesses.

KENNETH WRIGHT DAUGHDRILL.

Witnesses:
    L. H. BROWN,
    W. J. ROBINETT.